(12) United States Patent
Hasan et al.

(10) Patent No.: US 12,267,376 B2
(45) Date of Patent: Apr. 1, 2025

(54) METHODS FOR IDENTIFIER-BASED VIDEO STREAMING AND SESSIONIZATION

(71) Applicant: Mux, Inc., San Francisco, CA (US)

(72) Inventors: Masroor Hasan, Alameda, CA (US); Channing Conger, Woodside, CA (US); Wanda Chiu, San Ramon, CA (US); Ryan Grothouse, Philpot, KY (US); Adam Brown, Oakland, CA (US)

(73) Assignee: Mux, Inc., San Francisco, CA (US)

( * ) Notice: Subject to any disclaimer, the term of this patent is extended or adjusted under 35 U.S.C. 154(b) by 0 days.

(21) Appl. No.: 18/241,737

(22) Filed: Sep. 1, 2023

(65) Prior Publication Data

US 2024/0114066 A1   Apr. 4, 2024

Related U.S. Application Data

(60) Provisional application No. 63/403,196, filed on Sep. 1, 2022.

(51) Int. Cl.
*H04L 65/612* (2022.01)
*H04L 65/1069* (2022.01)
*H04N 21/00* (2011.01)

(52) U.S. Cl.
CPC ........ *H04L 65/612* (2022.05); *H04L 65/1069* (2013.01); *H04N 21/00* (2013.01)

(58) Field of Classification Search
CPC .................... H04L 65/612; H04L 65/1069
See application file for complete search history.

(56) References Cited

U.S. PATENT DOCUMENTS

| | | | |
|---|---|---|---|
| 8,169,345 B2 | 5/2012 | Evans et al. |
| 9,100,509 B1 | 8/2015 | Jia et al. |
| 9,164,874 B1 | 10/2015 | Tomay et al. |
| 9,549,152 B1 | 1/2017 | Nayyar et al. |
| 10,116,970 B1 | 10/2018 | Banerjee |
| 10,547,856 B2 | 1/2020 | Cock et al. |

(Continued)

OTHER PUBLICATIONS

Engineering and Developers Blog, What's happening with engineering and developers at YouTube, YouTube (2018).

(Continued)

*Primary Examiner* — Glenton B Burgess
*Assistant Examiner* — Jihad K Boustany
(74) *Attorney, Agent, or Firm* — Run8 Patent Group, LLC; Peter Miller

(57) ABSTRACT

A method includes, during an initial time: receiving a manifest request, for a video, from a device associated with a first address; generating an identifier associated with the first address; generating a manifest defining a set of segments available for the video; and serving the manifest. The method further includes, during a first time: receiving a first request for a first segment, in the set of segments, the first request associated with the first address and the identifier; and based on association between the first address and the identifier, serving the first segment to the first address. The method also includes, during a second time: receiving a second request for a second segment in the set of segments, the second request associated with a second address and the identifier; and based on disassociation of the second address and the identifier, withholding delivery of the second segment to the second address.

17 Claims, 5 Drawing Sheets

(56) References Cited

U.S. PATENT DOCUMENTS

| | | |
|---|---|---|
| 10,719,301 B1 | 7/2020 | Dasgupta et al. |
| 10,834,158 B1* | 11/2020 | Bourgoyne ........ H04N 21/4825 |
| 11,343,492 B2 | 5/2022 | Chadwick |
| 11,395,020 B2 | 7/2022 | Phillips et al. |
| 2002/0069265 A1 | 6/2002 | Bountour et al. |
| 2005/0093885 A1 | 5/2005 | Savekar et al. |
| 2008/0086570 A1 | 4/2008 | Dey et al. |
| 2011/0035669 A1 | 2/2011 | Shirali et al. |
| 2011/0080940 A1 | 4/2011 | Bocharov et al. |
| 2012/0047542 A1 | 2/2012 | Lewis et al. |
| 2012/0254456 A1 | 10/2012 | Visharam et al. |
| 2013/0254346 A1 | 9/2013 | McGowan |
| 2013/0254611 A1 | 9/2013 | Amerga et al. |
| 2014/0025837 A1 | 1/2014 | Swenson et al. |
| 2014/0040015 A1 | 2/2014 | Haley et al. |
| 2014/0059166 A1 | 2/2014 | Mann et al. |
| 2014/0098985 A1 | 4/2014 | Brubeck |
| 2014/0247887 A1 | 9/2014 | Brueck et al. |
| 2015/0244757 A1 | 8/2015 | Zhuang et al. |
| 2016/0127440 A1 | 5/2016 | Gordon |
| 2016/0188743 A1 | 6/2016 | Vaish et al. |
| 2016/0210547 A1* | 7/2016 | Dekeyser ............... G06K 7/065 |
| 2016/0259930 A1 | 9/2016 | Jerusalimsky |
| 2016/0277466 A1* | 9/2016 | Lohmar ................ H04L 65/612 |
| 2016/0295216 A1 | 10/2016 | Aaron et al. |
| 2017/0041422 A1 | 2/2017 | Westphal |
| 2017/0083430 A1 | 3/2017 | Meerovich |
| 2017/0085634 A1 | 3/2017 | Guney et al. |
| 2017/0126256 A1 | 5/2017 | Salomons et al. |
| 2017/0140443 A1 | 5/2017 | McGowan et al. |
| 2017/0180746 A1 | 6/2017 | Li et al. |
| 2017/0180800 A1 | 6/2017 | Mayrand |
| 2017/0250855 A1 | 8/2017 | Patil et al. |
| 2017/0280181 A1 | 9/2017 | Ramaley |
| 2017/0364372 A1 | 12/2017 | Harpur et al. |
| 2018/0034880 A1 | 2/2018 | Choi |
| 2018/0062965 A1 | 3/2018 | Mcnair et al. |
| 2018/0157582 A1 | 6/2018 | Marum et al. |
| 2018/0332320 A1 | 11/2018 | Barkley et al. |
| 2019/0069046 A1 | 2/2019 | Sauer et al. |
| 2019/0090001 A1 | 3/2019 | Smith et al. |
| 2019/0102351 A1 | 4/2019 | Wu et al. |
| 2019/0146951 A1 | 5/2019 | Velmurugan et al. |
| 2019/0149859 A1 | 5/2019 | George et al. |
| 2019/0182554 A1 | 6/2019 | Schupak et al. |
| 2019/0208245 A1 | 7/2019 | Xu |
| 2019/0379895 A1 | 12/2019 | Katsavounidis et al. |
| 2020/0106778 A1* | 4/2020 | Park ..................... H04L 63/108 |
| 2020/0304849 A1 | 9/2020 | Hassler et al. |
| 2021/0357482 A1* | 11/2021 | Devir ..................... H04N 5/913 |
| 2023/0306090 A1* | 9/2023 | Elad ..................... H04L 9/0866 |
| 2023/0388570 A1* | 11/2023 | Sen ................... H04N 21/8456 |

OTHER PUBLICATIONS

Final Office Action received in U.S. Appl. No. 16/458,630 dated Oct. 6, 2021.

Final Office Action received in U.S. Appl. No. 16/458,630 dated Sep. 14, 2020.

Netflix Technology Blog, "Per-Title Encode Optimization", Medium (2014).

Non-Final Office Action received in U.S. Appl. No. 16/458,630 dated Apr. 1, 2021.

Non-Final Office Action received in U.S. Appl. No. 16/458,630 dated May 13, 2020.

Non-final Office Action received in U.S. Appl. No. 18/131,813 dated Nov. 9, 2023.

Zwantschko, Gernot, "What Is Per-Title Encoding?", Bitmovin (2017).

* cited by examiner

METHODS FOR IDENTIFIER-BASED VIDEO STREAMING AND SESSIONIZATION

CROSS-REFERENCE TO RELATED APPLICATIONS

This Application claims the benefit of U.S. Provisional Application No. 63/403,196, filed on 1 Sep. 2022, which is incorporated in its entirety by this reference.

This Application is also related to U.S. patent application Ser. No. 16/458,630, filed on 1 Jul. 2019, U.S. patent application Ser. No. 16/820,592, filed on 16 Mar. 2020, and U.S. patent application Ser. No. 17/031,536, filed on 24 Sep. 2020, each of which is incorporated in its entirety by this reference.

TECHNICAL FIELD

This invention relates generally to the field of video streaming and sessionization and more specifically to a new and useful method for identifier-based video streaming and sessionization in the field of video streaming and sessionization.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
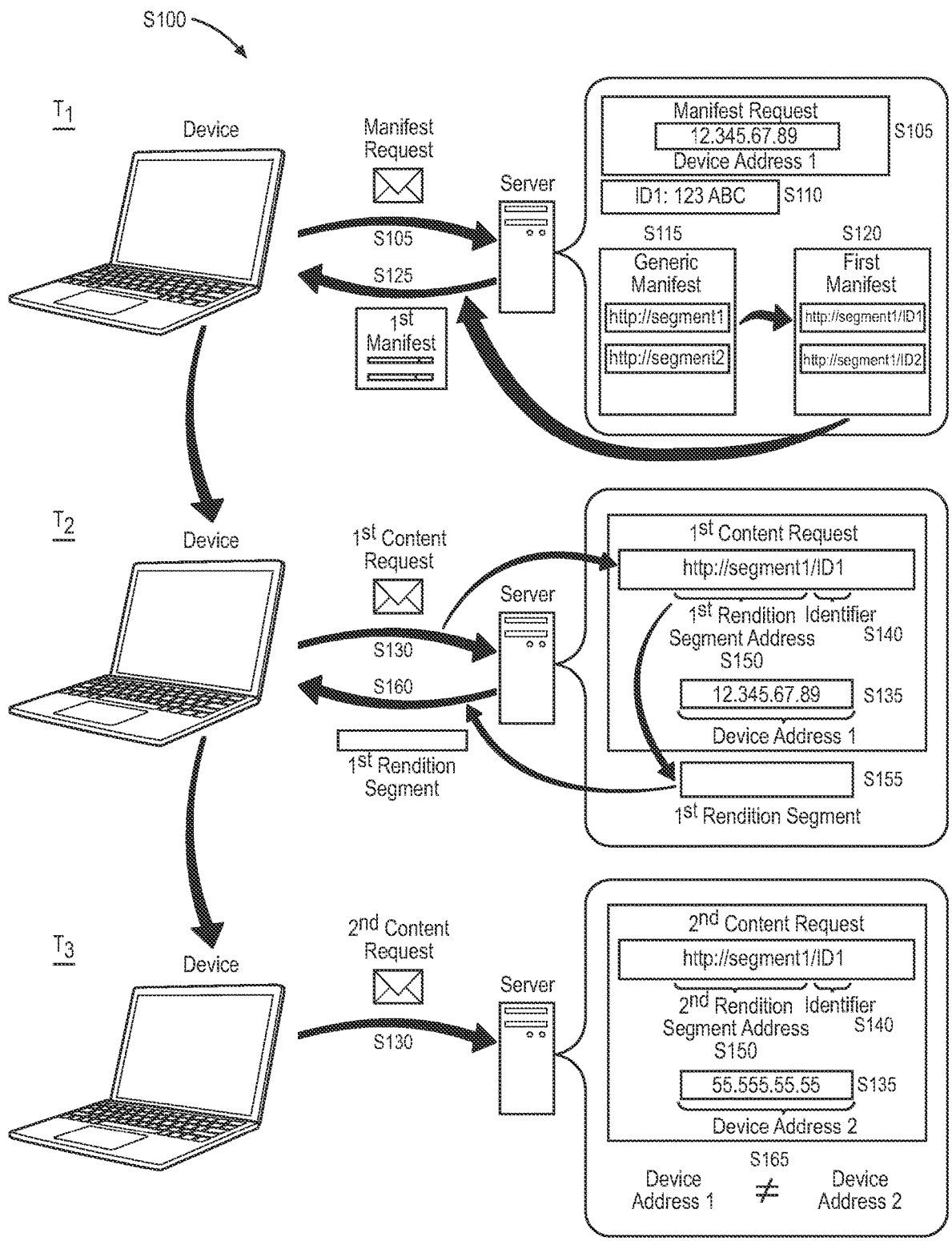
FIG. 1 is a flowchart representation of a method.

As shown in FIG. 1, a method S100 for video streaming and sessionization includes, during an initial time period, in response to receiving a manifest request, in Block S105, for a digital video, from a first device associated with a first device address: generating a first session identifier associated with the first device address in Block Silo; retrieving a generic manifest defining a set of rendition segment addresses of a set of rendition segments, within a set of renditions, available at the initial time period for the digital video in Block S115; generating a first manifest defining the set of rendition segment addresses annotated with the first session identifier in Block S120; and serving the first manifest to the first device in Block S125.

The method S100 also includes, during a first time period: receiving a first content request for a first rendition segment, in the set of rendition segments, of a first rendition, in the set of renditions in Block S130; detecting the first device address in the first content request in Block S135; and detecting the first session identifier in the first content request in Block S140. The method also includes, based on association between the first device address and the first session identifier: extracting a first rendition segment address, for the first rendition segment, from the first content request in Block S150; retrieving the first rendition segment at the first rendition segment address in Block S155; and serving the first rendition segment to the first device address for playback in Block S160.

The method S100 also includes, during a second time period: receiving a second content request for a second rendition segment in the first rendition in Block S130; detecting a second device address in the second content request in Block S135; detecting the first session identifier in the second content request in Block S140; and, based on disassociation of the second device address and the first session identifier, withholding delivery of the second rendition segment to a device at the second device address in Block S165.

1.1 Variation: Sessionization Data for Stored Video

Figure 2:
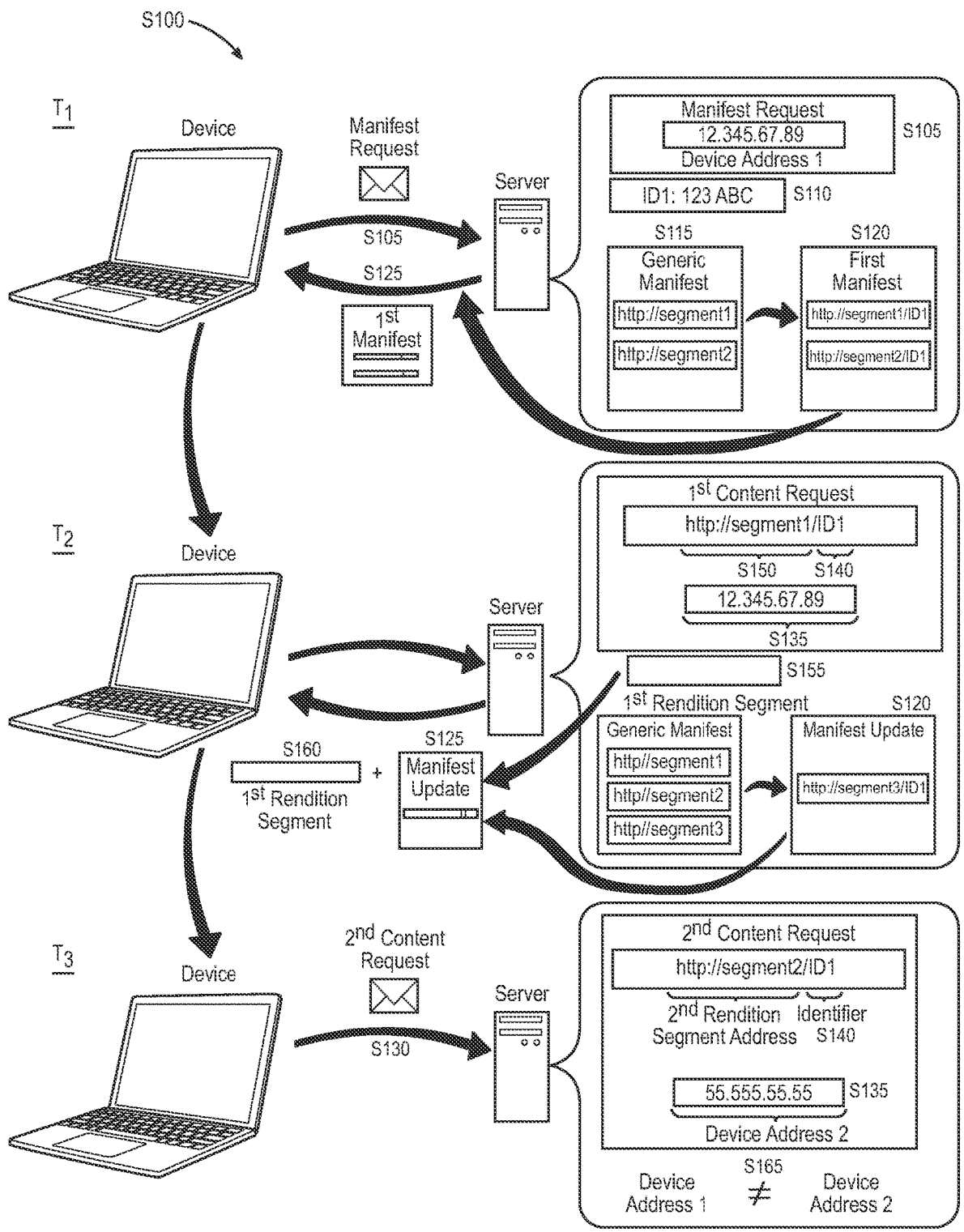
FIG. 2 is a flowchart representation of one variation of the method.

As shown in FIG. 2, one variation of the method S100 includes, during an initial time period, in response to receiving a manifest request, in Block S105, for a digital video, from a first device associated with a first device address: generating a first session identifier associated with the first device address in Block Silo; retrieving a generic manifest defining a set of rendition segment addresses of a set of rendition segments, within a first rendition in Block S115; generating a first manifest defining the set of rendition segment addresses annotated with the first session identifier in Block S120; and serving the first manifest to the first device in Block S125.

The method S100 also includes, during a first time period: receiving a first content request for a first rendition segment in the set of rendition segments of the first rendition in Block S130; detecting the first device address in the first content request in Block S135; detecting the first session identifier in the first content request in Block S140; extracting a first rendition segment address, for the first rendition segment, from the first content request in Block S150; retrieving the first rendition segment at the first rendition segment address in Block S155; and serving the first rendition segment to the first device address for playback in Block S160.

The method S100 also includes, during a second time period: receiving a second content request for a second rendition segment in the first rendition in Block S130; detecting a second device address in the second content request in Block S135; detecting the first session identifier in the second content request in Block S140; extracting a second rendition segment address, for the second rendition segment, from the second content request in Block S145; retrieving the second rendition segment at the second rendition segment address in Block S155; and serving the second rendition segment to the second device address for playback in Block S160. The method S100 also includes, associating the first content request and the second content request with a singular playback of the digital video based on detection of the first session identifier in the first content request and the second content request in Block S138.

1.2 Variation: Anomalous Access Detection in Video Requests

Figure 3:
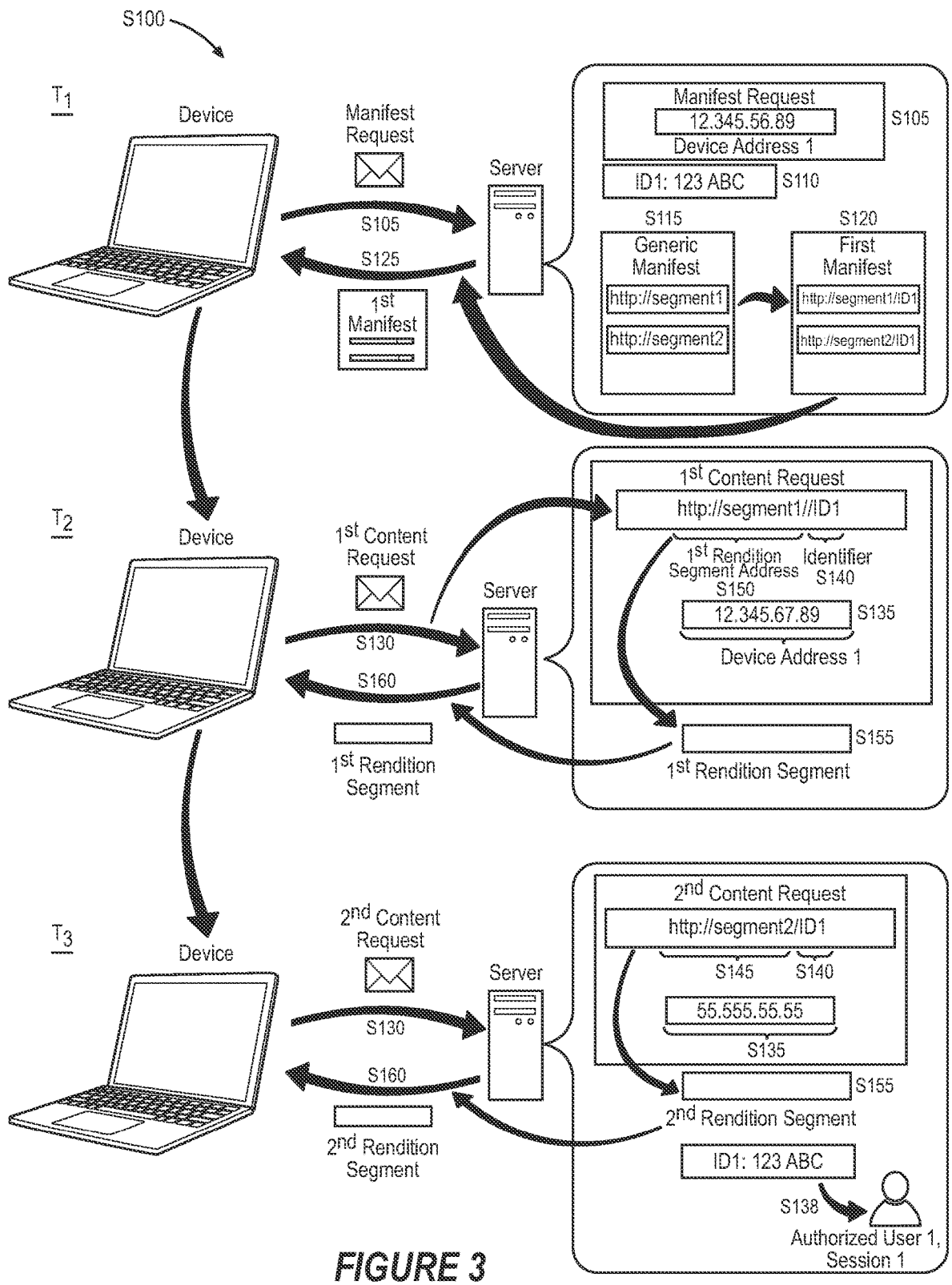
FIG. 3 is a flowchart representation of one variation of the method.
Figure 4:
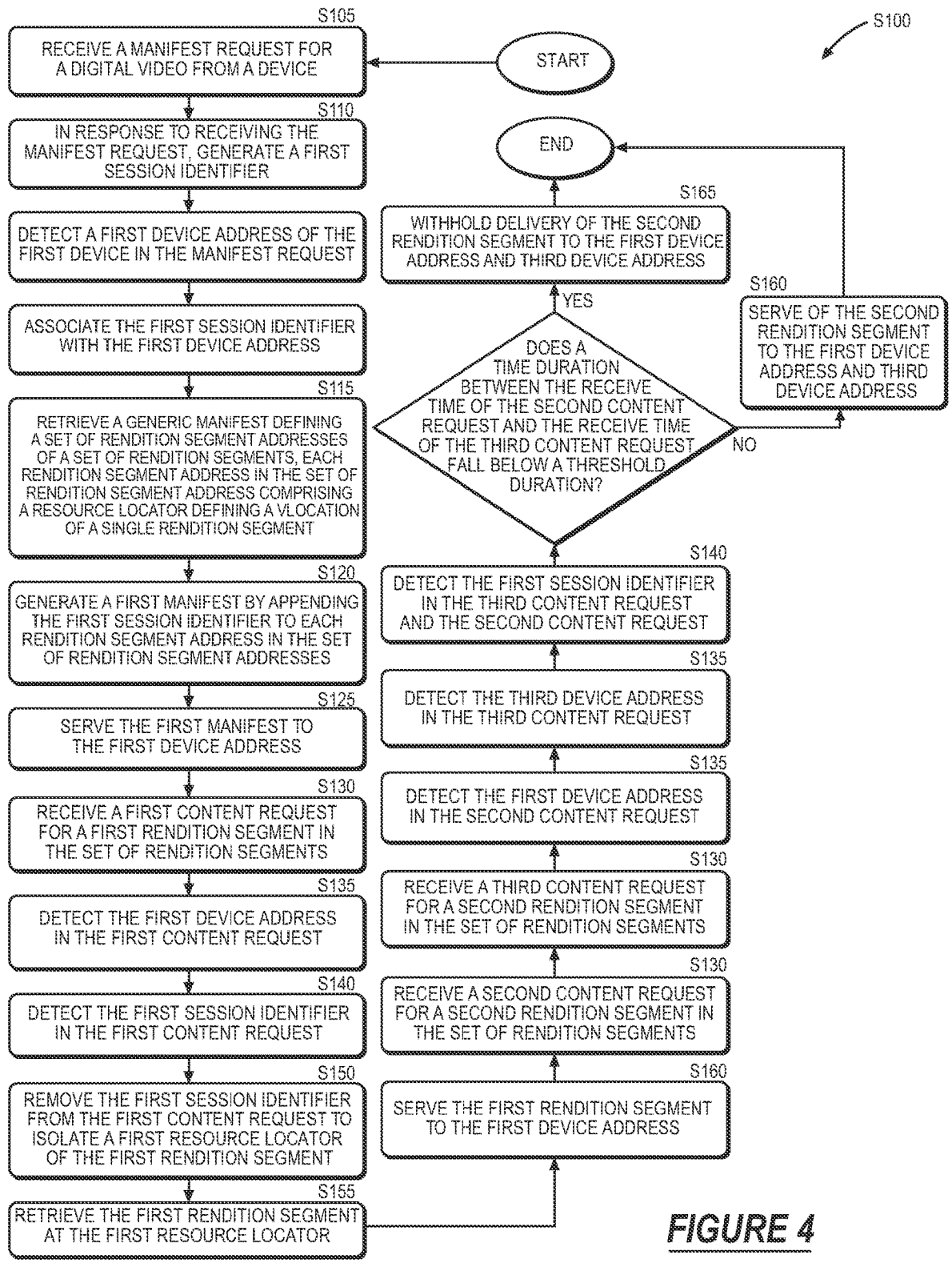
FIG. 4 is a flowchart representation of one variation of the method.
Figure 5:
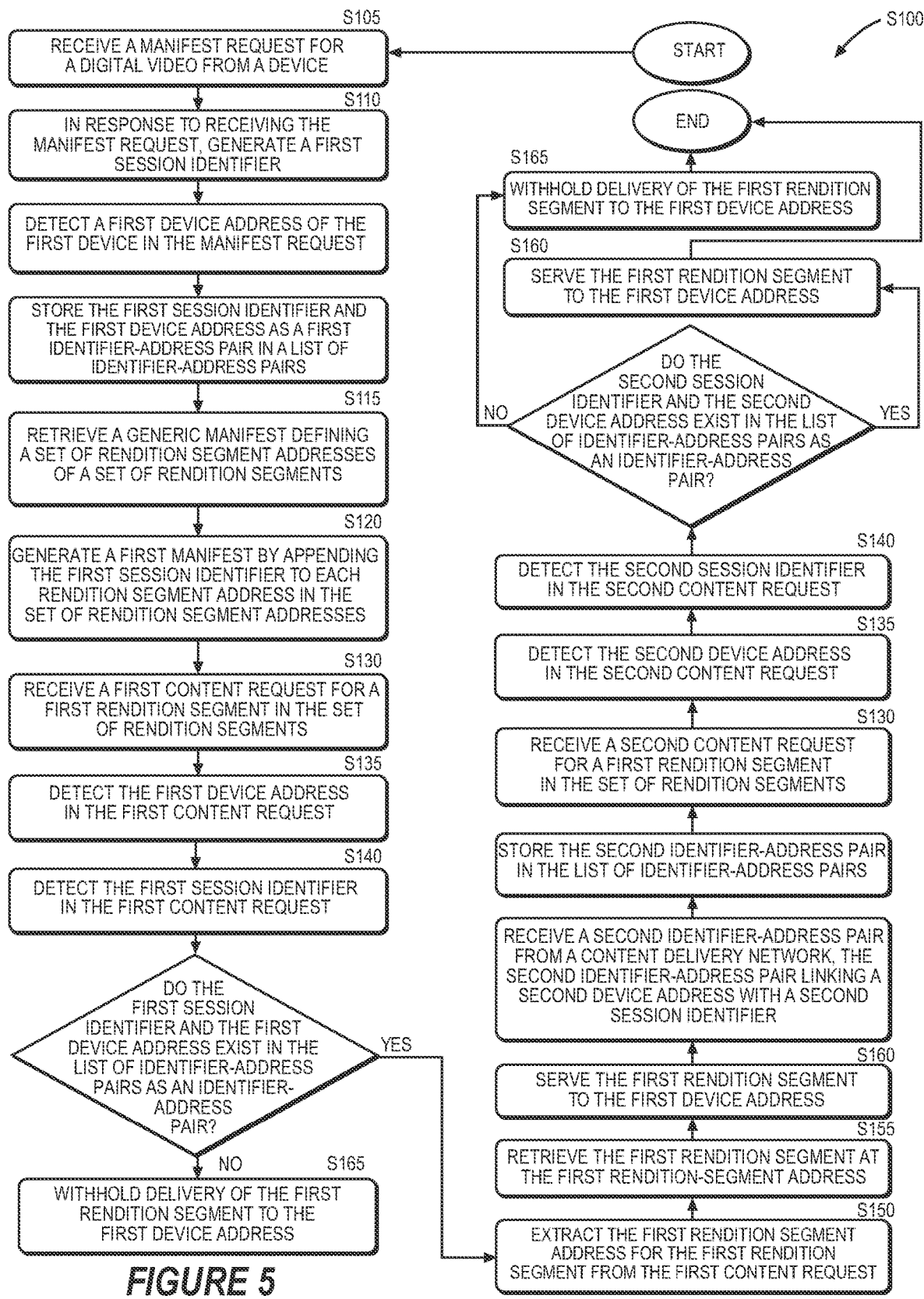
FIG. 5 is a flowchart representation of one variation of the method.

As shown in FIG. 3, one variation of the method S100 includes, during an initial time period, in response to receiving a manifest request, in Block S105, for a live video, from a first device associated with a first device address: generating a first session identifier associated with the first device address in Block Silo; retrieving a generic manifest defining an initial set of rendition segment addresses of an initial set of rendition segments, within a first rendition, available at the initial time period for the live video in Block S115; generating a first manifest defining the initial set of rendition segment addresses annotated with the first session identifier in Block S120; and serving the first manifest to the first device in Block S125.

In this variation, the method S100 further includes, during a first time period: receiving a first content request for a first rendition segment in the initial set of rendition segments of the first rendition in Block S130; detecting the first device address in the first content request in Block S135; and detecting the first session identifier in the first content request in Block S140. The method S100 also includes, based on association between the first device address and the first session identifier: extracting a first rendition segment address, for the first rendition segment, from the first content request in Block S150; retrieving the first rendition segment at the first rendition segment address in Block S155; serving the first rendition segment to the first device address for playback in Block S160; accessing a first set of rendition segment addresses of a first set of rendition segments, within the first rendition, available at the first time period for the live video in Block S112; generating a first manifest update defining the first set of rendition segment addresses annotated with the first session identifier in Block S120; and serving the first manifest update to the first device address in Block S125.

In this variation, the method S100 further includes, during a second time period: receiving a second content request for a second rendition segment in the first set of rendition segments of the first rendition in Block S130; detecting a second device address in the second content request in Block S135; detecting the first session identifier in the second content request in Block S140; and, based on disassociation of the second device address and the first session identifier, withholding delivery of the second rendition segment to a device at the second device address in Block S165.

1.3 Variation: Sessionization Profile Generation and Investigation

As shown in FIGS. 1-3, one variation of the method S100 includes: during a first time period, receiving a manifest request, for a digital video, from a device in Block S105; generating a session identifier responsive to the manifest request in Block Silo; retrieving a generic manifest associated with the digital video, and defining a set of addresses of a set of rendition segments within a set of renditions of the digital video in Block S115; generating a first manifest for the manifest request by appending the session identifier to base addresses of the set of renditions defined in the generic manifest in Block S120; and serving the first manifest address to the device in Block S125.

In this variation, the method S100 further includes, during a second time period, receiving a first content request from the device in Block S130; in response to detecting the session identifier in the first content request, associating the first content request with the device in Block S135; deriving a first rendition segment address based on the first content request and the session identifier in Block S145; retrieving a first rendition segment at the first rendition segment address in Block S155; and returning the first rendition segment address to the device for playback of the first rendition segment at the device in Block S160.

In this variation, the method S100 further includes, during a third time period, receiving a second content request from the device for a second rendition segment in Block S130; and, in response to detecting the session identifier in the first content request and the second content request in Block S135 and reception of the first content request and the second content request during a threshold period of time, aggregating the first content request and the second content request to generate a manifest profile associated with the generic manifest in Block S138, identifying a second device associated with the second content request in Block S140, prompting investigation of the second content request in Block S143, and withholding distribution of the first and the second rendition segments to the first and the second device in Block S165.

2. Applications

Generally, the method S100 is executed by a computer system in cooperation with one or more content distribution networks (hereinafter "CDNs") that access databases containing video segments catalogued by one or more resource locators (e.g., a Uniform Resource Locator ("URL") address). Generally, a CDN functions to distribute digital content (including digital video segments) to internet users throughout a geographic region. The computer system can be configured to access, receive, ingest, configure, and/or store video content, for example including rendition segments of digital video data.

In one example, the computer system is configured to execute the method S100 to: receive manifest requests for generic manifests from devices, associate manifest requests with the requesting devices based on a session identifier corresponding to a particular device, fulfill subsequent requests for manifest content (e.g., a set of rendition segments in a set of renditions defined in the manifest) responsive to identifying the session identifier in the requests; and facilitate sessionization and investigation of profiles descriptive of generic manifest activity and request behavior. Thus, the computer system can execute the method S100 to reduce piracy of manifest content, reduce consumption (e.g., streaming, download, distribution, etc.) of video content by non-human actors (e.g., bots, crawlers, etc.), and facilitate post-hoc sessionization and investigation of content requests sent to CDNs by associating a session identifier with a device, identifying the session identifier in subsequent content requests received from the device, deriving addresses for manifest content based on the content requests and the session identifier, and delivering the manifest content specified by the content requests to the device associated with the session identifier.

In one implementation, the computer system can: receive a manifest request—for manifest content—from a device; generate a session identifier responsive to the manifest request for the device; retrieve a generic manifest associated with the manifest content; generate a first manifest (e.g., a device specific domain) for the manifest request by appending the session identifier to base addresses of a set of renditions defined in the generic manifest; and return the first manifest address to the device. In this example, the computer system can correlate a generic manifest for subsequent content requests to the device based on the device-specific session identifier. For example, in response to receiving a content request including the device-specific session identifier, for content in the generic manifest, from a device associated with the device-specific session identifier, the computer system can fulfill the content request by serving the manifest content to the devide. Thus, the computer system can prevent reception of content requests from a device responsive to absence of the session identifier in content requests. In another example, the computer system can correlate a generic manifest for content requests to the device despite recording a set of connectivity change events at the device. For example, responsive to detecting a connectivity change event at a device, classified by detecting multiple device addresses (e.g., IP addresses) for the device within a period of time, and detecting that the multiple device addresses correspond to the device, the computer system can fulfill the content requests to the device at the multiple device addresses. However, the computer system can restrict access to and distribution of manifest content when the computer system detects anomalous behavior in a set of content requests. For example, responsive to receiving a set of content requests from a set of different device addresses and identifying multiple session identifiers in the content requests, the computer system can withhold distribution of the manifest content and prompt investigation of the content requests to confirm whether the set of different device addresses originate from a single device or across multiple devices. In another example, the system can monitor a content request frequency (e.g., hourly request, daily request, monthly request) for a particular manifest content (e.g., a set of rendition segments) for a session identifier. Thus, in response to detecting a content request frequency, associated with a session identifier, exceeding a request threshold, the system can flag the session identifier associated with the content requests and withhold distribution of the manifest content until expiration of a time period.

In another implementation, the computer system can: receive a content request from the device; and, in response to detecting the session identifier in the content request, associate the content request with the device; derive a rendition segment address based on the content request and the session identifier; retrieve a rendition segment at the rendition segment address; and return the rendition segment address to the device for playback of the rendition segment at the device. In this example, the computer system verifies presence of the session identifier in each content request to facilitate distribution of manifest content to the device associated with the session identifier. Thus, the computer system can reduce piracy of manifest content (e.g., rendition segments) by enabling distribution of manifest content based on the session identifier associated with the device and present in the content request. In this example, the computer system refrains from caching the content requests because each content request is a user-specific data based on the session identifier.

In another implementation, the computer system can generate alerts and/or facilitate device throttling to limit distribution of manifest content responsive to detecting anomalies in requests for manifest content linked to a particular manifest via manifest content addresses, such as: detecting requests for manifest content at a request address (single URL) from multiple devices or from multiple device addresses (e.g., IP addresses) in different geographic regions (e.g., indicating a potential VPN bot); receiving a quantity of content requests exceeding a manifest-specific request threshold, during a period of time, from a particular request address (e.g., indicating a spamming bot attempting to pirate a video); receiving content requests exceeding a request-frequency threshold; or detecting changes in device addresses for a device during a time period (e.g., indicating a connectivity change event at the device, such as between a wireless networking protocol to a cellular network). In this implementation, by detecting anomalies, prompting investigation of content requests, and withholding distribution of manifest content until content requests are verified by a manifest publisher or user associated with the session identifier, the computer system can reduce consumption (e.g., streaming, download, distribution, etc.) of manifest content by unauthorized devices and non-human actors (e.g., bots, crawlers, etc.).

Therefore, the computer system can execute the method S100 to facilitate sessionization and investigation of content requests based on historical profiles (e.g., CDN) associated with a session identifier and/or a generic manifest. In one implementation, the computer system can generate a manifest profile for a generic manifest associated with a publisher. For example, the computer system can: aggregate a set of content requests for manifest content of a generic manifest to generate a manifest profile (e.g., a log); and, in response to a trigger event—such as, notice of a sub-threshold viewing experience, a playback error, spamming of requests by a device, unauthorized distribution of a generic manifest, etc.—prompt investigation of the manifest profile to identify a source of the trigger event—such as, a connection issue, a hardware issue, a storage error, identification of a spamming device, etc. Therefore, the computer system can query the manifest profile response to a trigger event to prompt identification, investigation, and resolution of an error source.

3. Initial Manifest Request

Block S105 of the method S100 recites: receiving a manifest request for a digital video from a first device associated with a first device address during an initial time period. Generally, in Block S105, the computer system can receive a request for the manifest defining rendition segments and a set of renditions (e.g., bitrate-resolution pairs) available for the digital video from the first device.

In one implementation, the computer system can receive a request from a device for a manifest file associated with a video in Block S105. More specifically, the computer system can receive a manifest request for a generic (e.g., master manifest file) manifest describing content associated with a digital video—such as, a playlist for a set of rendition segments in a target rendition specified by a bitrate-resolution pair. The generic manifest can further define a base address (e.g., a URL) for each rendition segment in each available rendition for the digital video. For example, the computer system can, during a first time period, receive a manifest request, for a digital video, from a device, the manifest request specifying a generic manifest associated with the digital video and defining a set of addresses of a set of rendition segments within a set of renditions of the digital video. Therefore, in response to receiving the manifest request from a device, the computer system can trigger generation of a session identifier for the device.

4. Identifier Generation

Block S110 of the method S100 recites: in response to receiving a manifest request for the digital video from the first device associated with the first device address, generating a first session identifier associated with the first device address. Generally, in Block S110, the computer system can: generate a first session identifier responsive to receipt of a manifest request from the device associated with a first device address (e.g., an internet protocol ("IP") address, a media access control ("MAC") address); and associate the first session identifier with the first device address to initialize a new session for the first device. Therefore, in Block S110, the computer system can: track content requests received from the first device via the first session identifier; aggregate viewership metrics (e.g., playback duration, content-switching rate) associated with the first device and the first session identifier; and flag unauthorized content requests that do not contain the first session identifier.

In one implementation, the device address of the first device includes an internet protocol address of the first device. In this implementation, the computer system can generate the first session identifier; and associate the first session identifier with the first internet protocol address. In another implementation, the device address of the first device includes a media access control address of the first device. In this implementation, the computer system can generate the first session identifier; and associate with the first session identifier with the first media access control address.

In another implementation, the computer system can generate an identifier associated with the manifest request in Block S110. More specifically, each time the computer system receives a manifest request from a new device, the computer system can generate a session identifier for the new device. For example, the computer system can generate a session identifier responsive to the manifest request and associated with the device. In one variation, the computer system can aggregate a set of metadata (e.g., a geolocation associated with the device, a device type, etc.) to define the session identifier for the device. For example, the computer system can generate the session identifier by aggregating a set of metadata descriptive of the device responsive to receiving the manifest request from the device. Additionally, or alternatively, the computer system can generate the session identifier by generating a random number at a target size (e.g., 32 bits, 256 bits). Therefore, the computer system can generate the session identifier corresponding to the device to uniquely identify the manifest request originating from the device. Thus, the computer system can differentiate the manifest request from a different manifest request originating at a second device.

In another implementation, the computer system can generate the session identifier by: accessing a historical viewership rate of the digital video; calculating a target size of the session identifier proportional to the viewership rate; and generating the first session identifier including a pseudorandom number of the target size. Therefore, the computer system can identify a target size for each session identifier in a set of session identifiers for a digital video, the target size proportional to the number of views the digital video receives or is expected to receive. Accordingly, the computer system can generate a larger session identifier (e.g., session identifier with more bits) for a frequently-requested video to ensure that each session (e.g., each requesting device) is associated with a unique session identifier.

In a similar implementation, the computer system can, for a live video: predict viewership rate based on viewership counts of previously-streamed videos of the publisher of the live video; calculate the target size of the session identifier proportional to the viewership rate; and generate the first session identifier including a pseudorandom number of the target size. Therefore, the computer system can identify the target size for each session identifier in a set of session identifiers for the live video, the target size proportional to the number of views received by other videos streamed by the publisher of the live video.

5. Manifest Generation

Blocks S115, S120, and S125, of the method S100 recite: retrieving a generic manifest defining a set of rendition segment addresses of a set of rendition segments, within a set of renditions, available at the initial time period for the digital video; generating a first manifest defining the set of rendition segment addresses annotated with the first session identifier; and serving the first manifest to the first device. Generally, in Blocks S115, S120, and S125, the computer system can generate the first manifest (e.g., first session manifest) to be served to the first device (e.g., manifest requesting device) by: accessing the generic manifest defining the set of rendition segment addresses of each rendition segment available for the digital video; and annotating each rendition segment address in the set of rendition segment addresses with the session identifier. Therefore, in Blocks S115, S120, and S125, the computer system can generate a pseudo-unique manifest for a particular session.

In one implementation, the computer system can retrieve the generic manifest defining: a first subset of rendition segment addresses in the set of rendition segment addresses, each rendition segment address in the first subset of rendition segment addresses including a resource locator defining a location of a single rendition segment, in the set of rendition segments, in the first rendition of the digital video, the first rendition corresponding to a first bitrate and a first resolution; and a second subset of rendition segment addresses in the set of rendition segment addresses, each rendition segment address in the second subset of rendition segment addresses including a resource locator defining a location of a single rendition segment, in the set of rendition segments, in a second rendition of the digital video, the first rendition corresponding to a second bitrate and a second resolution.

In this implementation, the computer system can generate the first manifest by: initializing the first manifest associated with the first device address; and storing the rendition segment address, appended with the first session identifier, in the first manifest for each rendition segment address, in the set of rendition segment addresses.

In another implementation, the computer system can generate the first manifest by: initializing the first manifest associated with the first device address; and for each rendition segment address, in the set of rendition segment addresses, encoding the first session identifier into the rendition segment address based on a key associated with the first session identifier. For example, the computer system can: transform the first session identifier into a specialized format; and append the transformed first session identifier to the first device address. Alternatively, the computer system can: append the first session identifier to the first device address; and transform the first session identifier and the first device address into the specialized format. In one implementation, the computer system can encode first session identifier into the rendition segment address based on a key by encrypting the first session identifier based on the key.

In another implementation, the computer system can generate a manifest address associated with the manifest request based on the session identifier. More specifically, the computer system can aggregate the session identifier with a base address (e.g., a base URL) associated with each rendition segment in the set of available renditions in the generic manifest to generate a first manifest address for the manifest request.

In one variation, the computer system can append the session identifier to the end of the base address to generate the first manifest address. Additionally, or alternatively, the computer system can append the session identifier within a string of characters defining the base address to generate the first manifest address. Once the computer system generates the first manifest address, the computer system can serve the first manifest to the device. For example, the computer system can: retrieve the generic manifest associated with the digital video; generate the first manifest address for the manifest request by appending the session identifier to base addresses of the set of renditions defined in the generic manifest; and serve the first manifest to the device. Thus, the computer system can generate the first manifest for a particular device based on the session identifier in order to facilitate fulfillment of subsequent requests for content (e.g., a set of rendition segments) associated with the first manifest.

5.1 Live Video Manifest Generation and Update

In one variation, Blocks S115, S120, and S125 of the method S100 recite: retrieving a generic manifest defining an initial set of rendition segment addresses of an initial set of rendition segments, within a first rendition, available at the initial time period for the live video; generating a first manifest defining the initial set of rendition segment addresses annotated with the first session identifier; and serving the first manifest to the first device. Generally, in Blocks S115, S120, and S125, the computer system can: access the generic manifest defining the initial set of rendition segment addresses of the initial set of rendition segments that are available during the initial time period and after the initial time period (e.g., for a limited amount of time); and generate the first manifest by annotating the initial set of rendition segment addresses with the first session identifier. Therefore, the computer system can generate the first manifest defining the initial set of rendition segment addresses that can be requested by the first device following reception of the first manifest by the first device.

In one implementation, the computer system can serve manifest updates to the requesting device as new rendition segments become available. In one implementation, during the first time period, the computer system can: access a first set of rendition segment addresses of the set of rendition segments, within the set of renditions, available at the first time period for the digital video; generate a first manifest update defining the first set of rendition segment addresses annotated with the first session identifier; and serve the first manifest update to the first device address. Therefore, the computer system can: access the rendition segment addresses of rendition segments that are available during the first time period, and that were not available during the initial time period; and generate a manifest update indicating the newly available rendition segments. For example, as a live video is captured and aired, new rendition segments of the live video become available. In addition, segments of the live video may only be available for a limited time duration. Therefore, the manifest update may indicate that certain rendition segments are no longer available for viewing.

6. Content Request

Blocks S130, S135, and S140 of the method S100 recite: receiving a first content request for a first rendition segment, in the set of rendition segments, of a first rendition, in the set of renditions; detecting the first device address in the first content request; and detecting the first session identifier in the first content request during a first time period. Generally, in Blocks S130, S135, and S140, the computer system can: receive a content request for a rendition segment (e.g., first rendition segment) defined in the manifest and in a rendition (e.g., first rendition) also defined in the manifest; detect the device address (e.g., internet protocol address) of the device that sent the content request; and detect the session identifier in the first content request. Therefore, in Blocks S130, S135, and S140, the computer system can extract user information (e.g., device address) and session information (e.g., session identifier) from content requests.

In one implementation, the computer system can receive a request from the device for content in the first manifest based on the session identifier and associate the first content request with the device to facilitate distribution of the content to the device. More specifically, the computer system can receive a content request from the device specifying a request for a set of rendition segments in a target rendition specified by the generic manifest. The computer system can query the content request to identify presence of the session identifier in the content request. In response to detecting the session identifier in the content request, the computer system can associate the content request with the device based on the session identifier. For example, the computer system can: receive a first content request from the device specifying a first target rendition segment; and, in response to detecting the session identifier in the first content request, associate the first content request with the device.

7. Content Distribution

Blocks S150, S155, and S160 of the method S100 recite, based on association between the first device address and the first session identifier: extracting a first rendition segment address, for the first rendition segment, from the first content request; retrieving the first rendition segment at the first rendition segment address; and serving the first rendition segment to the first device address for playback. Generally, in Block S150, S155, and S160, the computer system can: verify that the device address is linked to the first session identifier (e.g., in a database), indicating that the content request is authorized and likely non-malicious; extract the rendition segment address (e.g., uniform resource locator) for the requested rendition segment from the content request; retrieve the rendition segment; and serve the rendition segment to the requesting device. Therefore, in Block S150, S155, and S160, the computer system can facilitate distribution of content (e.g., rendition segments of the digital video) specified by the content request to an authorized device based on the session identifier associated with the device.

In one implementation, the computer system can retrieve the generic manifest defining: a first subset of rendition segment addresses in the set of rendition segment addresses, each rendition segment address in the first subset of rendition segment addresses including a resource locator defining a location of a single rendition segment, in the set of rendition segments, in the first rendition of the digital video, the first rendition corresponding to a first bitrate and a first resolution; and a second subset of rendition segment addresses in the set of rendition segment addresses, each rendition segment address in the second subset of rendition segment addresses including a resource locator defining a location of a single rendition segment, in the set of rendition segments, in a second rendition of the digital video, the first rendition corresponding to a second bitrate and a second resolution.

In this implementation, the computer system can extract the first rendition segment address from the first content request by: removing the first session identifier from the first content request to isolate a first resource locator defining a first location of the first rendition segment. Then, the computer system can retrieve the first rendition segment at the first resource locator.

In one implementation, the computer system can extract the first rendition segment address from the first content request by: retrieving the key associated with the first session identifier assigned to the first device address; and, based on the key, retrieving the first rendition segment address. In this implementation, the computer system can retrieve the first rendition segment address by decoding the first content request to isolate the first resource locator (e.g., the first rendition segment address) defining a first location of the first rendition segment.

In one implementation, the computer system can retrieve and return manifest content back to the device based on the session identifier. More specifically, the computer system can identify the manifest content (e.g., a target rendition segment) specified by the content request and query the generic manifest to derive an address (e.g., a rendition segment address) corresponding to the manifest content. The computer system can then retrieve the manifest content at the address and transmit the address to the device for playback of the manifest content at the device. For example, the computer system can, in response to detecting the session identifier in the first content request, derive a first rendition segment address based on the first content request and the session identifier; retrieve a first rendition segment at the first rendition segment address; and return the first rendition segment address to the device associated with the session identifier for playback of the first rendition segment at the device. Therefore, the computer system can facilitate distribution of manifest content specified by the content request to the accurate device based on the session identifier associated with the device. Thus, the computer system can reduce piracy or theft of manifest content by non-human actors, such as bots, by deriving addresses for manifest content and delivering manifest content addresses to the device based on session identifiers specific to the device.

8. Request Investigation

Generally, the computer system can detect an anomaly in a set of content requests and prompt investigation of the content request for a set of manifest content. More specifically, in response to receiving indication of an anomaly in a set of content requests—such as detecting a second device associated with a content request including the session identifier, detecting different devices addresses for a single device, detecting a content request frequency at a device greater than a threshold request frequency, etc.—the computer system can generate an alert to the first device associated with the session identifier to prompt investigation of the anomaly. For example, during a third time period, the computer system can: receive a second content request from the device; receive a third content request from the device; detect the session identifier in the second content request and the third content request; and, in response to identifying an anomaly in the third content request, prompt investigation of the third content request at the device. Additionally, or alternatively, the computer system can throttle or withhold distribution of manifest content specified by the manifest request to the device until the anomaly is confirmed or resolved. Therefore, by detecting anomalies in a set of content requests from a device, the computer system can notify manifest publishers or device users via alerts to prompt investigation of the anomaly at the device and/or withhold distribution of manifest content to the device until the anomaly is resolved.

9. Withholding Content

Blocks S130, S135, S140, and S165 of the method S100 recite, during a second time period: receiving a second content request for a second rendition segment in the first rendition; detecting a second device address in the second content request; detecting the first session identifier in the second content request; and, based on disassociation of the second device address and the first session identifier, withholding delivery of the second rendition segment to a device at the second device address. Generally, in Blocks S130, S135, S140, and S165, the computer system can: receive a content request for a rendition segment (e.g., first rendition segment) defined in the manifest and in a rendition (e.g., first rendition) also defined in the manifest; detect the device address (e.g., internet protocol address) of the device that sent the content request; detect the session identifier associated with the manifest; and, in response to absence of association between the device address and the session identifier, withholding distribution of the rendition segment to the device address. Therefore, the computer system can withhold distribution of rendition segments to an unauthorized device (e.g., as a device associated with device address that does not match the session identifier assigned to it).

In one implementation, the computer system can permit a threshold number of device address changes (e.g., device address associated with a single session identifier) prior to withholding distribution of requested rendition segments. For example, after receiving a first content request for a first rendition segment, the first content request associated with a first session identifier and a first device address, and serving the first rendition segment to the first device address, the computer system can: receiving a second content request for a second rendition segment in the first rendition; detect a second device address in the second content request; detecting the first session identifier in the second content request; serving the second rendition segment to the second device address for playback by a device at the second device address; and associating the second device address with the first session identifier. Then, following the association of the second device address with the first session identifier, the computer system can: receiving a third content request for a third rendition segment in the first rendition; detecting a third device address in the third content request; detecting the first session identifier in the third content request; in response to the third device address differing from the first device address and the third device address, withholding delivery of the second rendition segment. Therefore, the computer system can allow a threshold number of (e.g., three) different device addresses to request rendition segments with the same session identifier prior to withholding distribution of requested rendition segments to ensure that devices undergoing connectivity changes (e.g., from Wi-Fi to cellular internet) are not mistaken for unauthorized devices.

In another implementation, in response to detecting absence of an association between the device address and the session identifier, the computer system can withhold further delivery of rendition segments of the video (or any other video from the same or other publisher) to this device address, such as indefinitely or for a threshold time duration (e.g., one minute, one hour, one day, one week). The computer system can: aggregate a number of unauthorized content requests by incrementing the number of unauthorized content requests in response to response to detecting absence of an association between the device address and the session identifier; generate a notification indicating the number of unauthorized content requests; and serve the notification to the publisher of the digital video.

Additionally or alternatively, the computer system can: retrieve an alternate video rendition segment containing frames depicting an error message (e.g., "unauthorized access detected"); and serve this alternate video rendition segment to the device in place of the rendition segment previously requested by the device. Therefore, in response to identifying an unauthorized video access attempt, the computer system can: notify the publisher of the digital video of the unauthorized video access attempt; or notify the unauthorized device that the requested video segment is withheld.

In another implementation, during a third time period between the first time period and the second time period, the computer system can: receive a third content request for a third rendition segment, in the set of rendition segments, of a first rendition, in the set of renditions; receive a fourth content request for the third rendition segment, in the set of rendition segments, of a first rendition, in the set of renditions; detect the first device address in the third content request; detect a third device address in the fourth content request; detect the first session identifier in the third content request and the fourth content request; and based on receiving the third content request with the first session identifier and the fourth content request with the first session identifier within a threshold time duration, withholding delivery of the third rendition segment to the first device address and the third device address. Therefore, the computer system can withhold delivery of the requested rendition segments in response to receiving more than one content request associated with a single session identifier.

In this implementation, after receiving multiple requests with the same session identifier, the computer system can still deliver the third rendition segment to the requesting device (e.g., device that generated the fifth content request) upon receiving a fifth content request for the third rendition segment at a subsequent time and identifying the first session identifier and in the fifth content request. Alternatively, after receiving multiple requests with the same session identifier, the computer system can deny serving third rendition segment to the requesting device (e.g., device that generated the fifth content request) until a new manifest request is received from an authorized requesting device.

10. Example: Generating a List of Identifier-Address Pairs

In one implementation, after generating a session identifier, the computer system can store the session identifier and the device address as a pair in a list of identifier-address pairs, thereby associating the session identifier and the device address. The computer system can look up device addresses associated with a particular session identifier in the list of identifier-address pairs and, thereby, verify associations between device addresses and session identifiers.

In this implementation, in response to receiving a manifest request, for the digital video, from a device associated with a device address during the initial time period, the computer system can: generate a session identifier associated with the device address; store the session identifier and the device address as a first pair in a list of identifier-address pairs; retrieve the generic manifest defining the set of rendition segment addresses of the set of rendition segments, within the set of renditions; generate a manifest defining the set of rendition segment addresses annotated with the session identifier; and serve the manifest to the device. Thus, after generating the session identifier associated with the device address, the computer system can store session identifier and the device address as the first identifier-address pair in the list of identifier-address pairs. In this implementation, during the first time period, the computer system can receive a content request for the first rendition segment, detect the device address in the content request, detect the session identifier in the content request, and, in response to identifying the device address and the session identifier stored as a first pair in the list of identifier-address pairs: extract the first rendition segment address, for the first rendition segment, from the content request; retrieve the first rendition segment at the first rendition segment address; and serve the first rendition segment to the device address for playback. Therefore, the computer system can: verify that the session identifier and the device address are linked by identifying the session identifier and the device address as the first identifier-address pair in the list of identifier-address pairs; and, in response to verifying the link between the session identifier and the device address, serve the first rendition segment to the device address for playback.

In this implementation, in response to a time duration between the initial time period and the second time period exceeding a threshold time duration, the computer system can remove the first identifier-address pair from the list of identifier-address pairs. Therefore, the computer system can remove the first identifier-address pair from the list of identifier-address pairs, thereby terminating association between the device address and the session identifier. By removing all identifier-address pairs associated with the session identifier in the list of identifier-address pairs, the computer system can terminate the session (e.g., viewing session) associated with the session identifier. The computer system can remove the first identifier-address pair from the list of identifier-address pairs after the threshold time duration (e.g., five minutes).

In this implementation, the computer system can: receive a second content request for a second rendition segment of the digital video in the first rendition; detect the device address in the fourth content request; detect the session identifier in the second content request; and, in response to failing to identify the device address and the device address stored as the first identifier-address pair in the list of identifier-address pairs, withhold delivery of the second rendition segment to a device at the third device address. Therefore, the computer system can withhold distribution of the second rendition segment in response to failing to identify the device address and the device address stored as the first identifier-address pair in the list of identifier-address pairs. The computer system can then generate a second session identifier for the device (e.g., upon receiving a new content request or a new manifest request from the device). Periodic retiring of session identifiers and their removal from the list of identifier-address pairs can enable the computer system to prevent content requests by unauthorized devices (e.g., devices that received the session identifier through unauthorized sharing of the session identifier) by retiring the session identifiers before they can be shared with a large number of unauthorized users.

In one implementation, upon storing a first identifier-address pair in a list of identifier-address pairs, a first content delivery network can transmit the first identifier-address pair to a content delivery network. In this implementation, in response to receiving a manifest request, for the digital video, from a device associated with a device address at the initial time period, the first content delivery network can: generate a session identifier and associate the session identifier with the device address; store the session identifier and the device address as a first identifier-address pair in a list of identifier-address pairs; and transmit the first identifier-address pair to a second content delivery network. In this implementation, the first content delivery network also can: receive a second identifier-address pair from the second content delivery network, the second identifier-address pair including a second session identifier associated with a second device address; and store the second identifier-address pair in the list of identifier-address pairs. Then, during the second time period, the first content delivery network can: receive a content request for the first rendition segment, in the set of rendition segments, of the first rendition; detect the second device address in the first content request; detect the second session identifier in the first content request; and, in response to identifying the second session identifier associated with the second device address stored as the identifier-address pair in the list of identifier-address pairs, serve the first rendition segment to the second device address for playback. Therefore, the first content delivery network can serve (or withhold serving) rendition segments to a device based on identifier-address pairs received from other content delivery networks.

11. Example: Withholding Content Based on Customer-Configured Thresholds

Generally, the computer system can configure thresholds for devices based on individual customer preferences. Additionally, or alternatively, the computer system can configure a set of request thresholds based on generic manifest characteristics—such as, a number of available renditions in the generic manifest, a number of rendition segments for a video, a release or publication date of a video, etc.

In one implementation, the computer system can define a device address threshold specifying a threshold number of device addresses including session identifiers that can request manifest content during a period of time. In this example, the computer system can permit a set of content requests from a first number (e.g., two) of device addresses (e.g., IP addresses) with session identifiers during a period of time, but restrict distribution of manifest content when the computer system receives the set of content requests from a second quantity (e.g., five) of device addresses exceeding an address request threshold during the period of time.

For example, the computer system can, receive a set of content requests from a set of devices during a first time period, each content request associated with a device address corresponding to a device in the set of devices; in response to the set of content requests, during the first time period, falling below an address request threshold, serving the manifest content specified by each content request to each corresponding device; and, in response to the set of content requests, during the first time period, exceeding an address request threshold, withholding distribution of manifest content to a subset of the set of devices for a second time period; flagging a subset of device addresses associated with the subset of devices for the second time period; and following expiration of the second time period, serving the manifest content to each corresponding device in the subset of devices.

In one implementation, the computer system can generate an alert in response to receiving a quantity of manifest requests for a particular rendition in the generic manifest exceeding a threshold quantity of requests for the rendition. In this example, the computer system can fulfill the content request by returning a rendition segment address to the device, and can post an alert (e.g., to the device, to a feed, etc.) to prompt investigation (e.g., real-time, postponed) of the content requests. For example, the computer system can receive a set of content requests specifying manifest content of a first rendition, from a set of devices, each content request associated with a device address corresponding to a device in the set of devices; in response to detecting that the set of content requests for manifest content of the first rendition exceeds a request threshold, return the first rendition segment address to the set of devices; and generate an alert to the device indicating that the quantity of content requests for manifest content of the first rendition exceeds the request threshold. Therefore, the computer system can alert the publisher of a generic manifest specifying that content (e.g., a set of rendition segments) in a target rendition defined by the generic manifest is requested at a rate exceeding a request threshold for the particular rendition, thereby prompting investigation of content requests to identify potentially malicious activity, such as consumption of manifest content by non-human actors.

In one variation, the computer system can define a set of thresholds for a customer (e.g., publisher of the generic manifest) based on an alert history for the customer. More specifically, responsive to detecting a history of manifest abuse (e.g., unauthorized manifest sharing for a video, CDN spamming, manifest content piracy, etc.) associated with a publisher, the computer system can define conservative—lower—thresholds for manifest content access and distribution for the customer. For example, the computer system can: define a first request threshold for manifest content in the generic manifest; monitor for alerts associated with the generic manifest during a first period of time; responsive to the alerts exceeding an alert threshold, withhold distribution of manifest content to a set of devices for a second period of time; and define a second request threshold for manifest content in the generic manifest, the second request threshold lower than the first request threshold. Therefore, the computer system can define thresholds for generic manifests with a history of abuse and alert generation to reduce opportunities for subsequent attacks and unauthorized manifest content access.

12. Example: Content Distribution During Connectivity Change

In one implementation, the computer system can detect a connectivity change event at a device based on the content request originating from the device. In this example, the computer system can derive a device address (e.g., a device IP address) for the device based on the content request to identify whether the device address is consistent between content requests. More specifically, the computer system can access a set of device addresses based on a set of content requests and detect a connectivity change event at the device—such as, connection from a wireless networking protocol (e.g., Wi-Fi) to a cellular network (e.g., 5G)—by identifying a difference between the set of device addresses associated with a device. For example, during a third time period, the computer system can: intercept a second content request from a first device; in response to detecting the session identifier in the second content request, associate the second content request with the first device, derive a second rendition segment address based on the second content request and the session identifier, retrieve a second rendition segment at the second rendition segment address, and return the second rendition segment address to the first device. The computer system can then: access a first device address for the first content request; access a second device address for the second content request; and, in response to detecting that the first device address and the second device address are incompatible and detecting that the first device address and the second device address correspond to the first device, record a connectivity change event at the first device. Therefore, the computer system can facilitate seamless manifest content distribution to a device despite changes in connectivity of the device, thereby reducing buffering in video content viewing (e.g., viewing of consecutive rendition segments). The computer system can also track a series of connectivity change events at the device during a time period to enable distribution of manifest content to the device during subsequent connectivity change events.

13. Example: Content Distribution Throttling

In one implementation, the computer system can throttle content distribution to a set of devices in response to receiving content requests from multiple devices, including the session identifier within a threshold period of time. More specifically, the computer system can receive a set of content requests for manifest content (e.g., rendition segments) at a set of device addresses (e.g., IP addresses). In this example, the computer system can identify the session identifier across the set of content requests despite receiving the set of content requests from different device addresses. However, in response to detecting that the set of device addresses are associated with a set of different devices and receiving the set of content requests during a threshold period of time, the computer system can flag the set of content requests as malicious and refuse to return the manifest content to the set of devices. Additionally, or alternatively, the computer system can generate and transmit a notification to the device associated with the session identifier, prompting investigation of the content requests.

For example, during a second time period, the computer system can, intercept a first content request for a first rendition segment at a first device address; intercept a second content request for a second rendition segment at a second device address; detect the session identifier in the first content request and the second content request; in response to associating the first device address with a first device and the second device address with a second device, and, in response to receiving the first content request and the second content request within a threshold time period, flag the first content request and the second content request as a malicious request; and withhold transmittal of the first and second rendition segments to the first and second device. Thus, the computer system can throttle manifest content distribution to multiple devices when the computer system receives multiple content requests within a time period and when the content requests mimic the device that is accurately associated with the session identifier.

14. Example: Location-Based Content Distribution Throttling

In one implementation, the computer system can throttle distribution of manifest content to the device based on a set of geolocation restrictions associated with the session identifier. More specifically, the computer system can withhold transmittal of rendition segment addresses to the device for playback of the associated rendition segment at the device in response to identifying multiple device addresses (e.g., IP addresses) in different geographic regions associated with a single session identifier. In this example, the computer system can withhold distribution of manifest content responsive to detecting device addresses across geolocations within a time frame and associated with a single device. For example, the computer system can: intercept the first content request at a first device address; intercept the second content request at a second device address; detect the session identifier in the first content request and the second content request; read a geographic location associated with the first content request and the second content request; and, in response to recognizing a first geographic location in the first content request and a second geographic location in the second content request, deny transmittal of manifest content associated with the first content request and the second content request to the device. Therefore, the computer system can prevent access to manifest content (e.g., rendition segments) by a device (e.g., a VPN bot) that the computer system does not authorize or recognize based on geolocation restrictions associated with the session identifier, thereby reducing opportunities for devices to pirate and distribute generic manifests to public sites (e.g., discussion websites, Internet forums) without consent of the device associated with the session identifier.

15. Example: Request-Frequency-Based Content Distribution Throttling

In one implementation, the computer system can throttle a device from receiving manifest content in response to receiving a quantity of requests at a frequency exceeding a request frequency threshold during a period of time. More specifically, the computer system can monitor a frequency of incoming content requests from a device associated with the session identifier during a period of time. In response to the frequency exceeding a request frequency threshold, the computer system can flag the device as a spamming device and withhold returning the manifest content to the device. For example, the computer system can: during the second time period, intercept a set of content requests from a device associated with a session identifier at a request frequency; in response to the request frequency exceeding a request frequency threshold, flag the device as a spamming device; and withhold distribution of manifest content to the device. Thus, the computer system can prevent manifest content distribution to a device spamming a CDN with requests during a period of time.

In one implementation, during the first time period, the computer system can receive a set of content requests from a device associated with a first session identifier with a first request frequency and, in response to the first request frequency exceeding a request frequency threshold: flagging the device as a spamming device; withholding distribution of manifest content to the device; and associating the first session identifier with a spamming device. In this implementation, during the second time period, the computer system can: receive a content request from the device associated with the first unique identifier; and, in response to associating the first session identifier with the spamming device, withhold distribution of manifest content to the third second device.

16. Playback Data Sessionization

Block S138 of the method S100 recites: associating the first content request and the second content request with a singular playback of the digital video based on detection of the first session identifier in the first content request and the second content request in Block S138. Generally, in Block S138, the computer system can associate two or more content requests with a singular playback of the digital video (e.g., a single session) based on two or more content requests being associated with a single session identifier (e.g., first session identifier). Therefore, the computer system can access data associated with a single session and based on the data, derive various metrics representative of viewing patterns of users, engagement levels with the digital video, and/or potential content preferences.

16.1 Deriving Playback Duration and Watch Percentage

In one implementation, the computer system can: during a first time period, receive a first content request for a first rendition segment, in the set of rendition segments, in the first rendition; during a second time period, receive a second content request for a second rendition segment in the first rendition; associate the first content request and the second content request with a first playback of the digital video based on detection of the first session identifier in the first content request and the second content request; access a video duration of the digital video; derive a playback duration of the first playback of the digital video based on the first content request and the second content request; and, based on the video duration and the playback duration, derive a watch percentage (e.g., percent of the digital video viewed during a single session) of the digital video at the first device address and the second device address. Therefore, in this implementation, the computer system can: associate a set of content requests with a single playback of the digital video by one device; derive the duration of the playback of the digital video by the device responsive to the set of content requests; and, based on the playback duration and the video duration, derive the watch percentage of the digital video by the device.

In one implementation, the computer system can derive a video completion rate for the digital video based on aggregated watch percentages across a population of devices. In particular, the computer system can: access a set of watch percentages for the digital video aggregated for the population of devices; classify a first subset of watch percentages, in the set of watch percentages, corresponding to 100% as completed views; classify a second subset of watch percentages, in the set of watch percentages, corresponding to less than 100% as incomplete views; derive a first quantity of complete views and a second quantity of incomplete views for the digital video; and derive the video completion rate based on the first quantity of complete views and the second quantity of incomplete views.

16.2 Calculating a Session Duration of a Viewing Session

In another implementation, the computer system can generate a session identifier that expires after a threshold amount of time (e.g., 20 minutes) of inactivity (e.g., no new content requests, no new manifest requests) of the device. In this implementation, during a third time period, following reception of the first content request for the first rendition segment from the first device address and reception of the second content request for the second rendition segment from the second device address, the computer system can: receive a third content request for a third rendition segment of the first set of rendition segments in the first rendition; detect a second device address in the third content request; and detect the first session identifier in the second content request. Then, in response to a time duration between the third time period and the second time period exceeding a threshold duration and, in response to not receiving any content requests associated with the first session identifier during the time duration, the computer system can: generate a second session identifier; retrieving the generic manifest; generate a second manifest defining the set of rendition segment addresses annotated with the second session identifier; and serve the second manifest to the first device.

Therefore, in response to receiving a content request associated with the first session identifier after a time period of not receiving content requests associated with the first session identifier, the time period exceeding the threshold duration (e.g., session termination due to inactivity threshold), the computer system can: terminate a first session associated with the first session identifier; and initiate a second session associated with the second session identifier, both the first session and the second session linked to a single device associated with the first device address and the second device address.

In this implementation, the computer system can also: receive a fourth content request for the third rendition segment in the set of rendition segments of the first rendition; and associate the fourth content request with a second playback of the digital video based on detection of the second session identifier in the fourth content request. Therefore, the computer system can initiate a second session (e.g., second playback of the digital video) based on detection of the second session identifier in the fourth content request.

In this implementation, during the third time period and, in response to the time duration between the third time period and the second time period exceeding the threshold duration, the computer system also can: calculate a session duration of a viewing session of the first device, the viewing session associated with the first session identifier. Therefore, after termination of the first session (e.g., session termination due reaching inactivity time threshold), the computer system can calculate the duration of the first session. Thus, computer system can assess playback metrics such as session duration based on session identifiers.

16.3 Deriving Content-Switching Frequency of a Session

In another implementation, the computer system can: generate a session identifier that spans multiple video views; use this session identifier to track playback of multiple videos by a single device; and derive metrics such as content-switching rate associated with the device. In this implementation, during a third time period, following reception of the first content request for the first rendition segment from the first device address and reception of the second content request for the second rendition segment from the second device address, the computer system can: receive a second manifest request, for a second digital video, from the first device associated with the first device address; retrieve a second generic manifest defining a second set of rendition segment addresses of a second set of rendition segments, within a first rendition, of the second digital video; generate a second manifest defining the second set of rendition segment addresses annotated with the first session identifier; and serve the second manifest to the first device. Accordingly, in response to receiving the second manifest request for the second digital video, the computer system can: generate the second manifest associated with the first session identifier; and serve the second manifest to the first device (e.g., requesting device), thereby extending the session associated with the first session identifier to playback of the second digital video.

In this implementation, during a fourth time period, the computer system can: receive a third content request for a third rendition segment in the second set of rendition segments of the first rendition; detect the first device address in the first content request; detecting the first session identifier in the first content request; extract a second rendition segment address, for the third rendition segment, from the third content request; retrieve the third rendition segment at the second rendition segment address; and serve the third rendition segment to the first device address for playback. Accordingly, in response to receiving the third content request for the third rendition segment of the second digital video, the computer system can: serve the third rendition segment to the first device (e.g., requesting device), thereby extending the session associated with the first session identifier to playback of the second digital video. In this implementation, the computer system further can: associate the first content request, the second content request, and the third content request with the first playback of the digital video based on detection of the first session identifier in the first content request, the second content request, and the third content request; and derive a content-switching rate based on the first content request, the second content request, and the third content request. Therefore, the computer system can: generate a session that spans multiple video views; and derive the content-switching rate (e.g., rate of switching playback between the first digital video and the second digital video) for this session.

16.4 Profile Generation

In one implementation, the computer system can generate a historical profile associated with the session identifier descriptive of historical activity including the session identifier. More specifically, the computer system can generate an identifier profile including a set of content requests based on the session identifier. In this example, the computer system can aggregate content requests to the identifier profile each time the computer system detects the session identifier in a content request. For example, the computer system can: receive the first content request including the session identifier and specifying a first set of rendition segments from the device; receive the second content request including the session identifier and specifying a second set of rendition segments from the device; and aggregate the first content request and the second content request to generate an identifier profile based on the session identifier. Thus, the computer system can generate a comprehensive record of content requests including the session identifier for subsequent sessionization and analytics of the identifier profile by a user associated with the device corresponding to the session identifier.

In one variation, the computer system can generate a manifest profile for a generic manifest descriptive of manifest requests received from devices for manifest content in the generic manifest. In this example, each time the computer system receives a manifest request for a generic manifest, the computer system can populate the manifest profile including metadata—such as the session identifier included in the manifest request for the device, a manifest content type (e.g., a target rendition, a target rendition segment) specified by a content request, a time stamp associated with the content request, a frequency of content requests from the device, etc. For example, the computer system can: at a first time, receive a first manifest request, for a digital video, from a first device; generate a first manifest address for the first manifest request by appending a first session identifier to base addresses of the set of renditions defined by the generic manifest; serve the first manifest to the first device; receive a second manifest request, for the digital video, from a second device; generate a second manifest address for the second manifest request by appending a second session identifier to base addresses of the set of renditions defined in the generic manifest; serve the second manifest to the second device; aggregate the first manifest request and the second manifest request to generate a manifest profile associated with the generic manifest and, at a second time, receive a third manifest request, for the digital video, from a third device; and append the third manifest request to the manifest profile. Therefore, the computer system can generate an exhaustive record of requests to a CDN for a generic manifest for subsequent sessionization and analytics of a generic manifest.

16.5 Profile Sessionization

In one implementation, the computer system can prompt investigation of the identifier profile corresponding to the session identifier in response to a trigger event. More specifically, the computer system can receive a request for investigation of an identifier profile associated with a customer device specifying a trigger event (e.g., notice of sub-threshold experience at a time, a manifest content playback error, an error associated with the content request with a device based on the session identifier, etc.). The computer system can then query the identifier profile based on a set of characteristics (e.g., an error time, an error date, an error type, etc.) to trace the trigger event to an event source (e.g., a data storage bucket, a server, a CDN, etc.). For example, the computer system can: receive a request for investigation of the identifier profile; query the identifier profile based on a set of characteristics descriptive of a trigger event; classify an event source associated with the trigger event; generate a notification indicating the event source; and transmit the notification to the device.

In one variation, the computer system can prompt investigation of the manifest profile corresponding to a generic manifest in response to a trigger event. More specifically, the computer system can receive a request for investigation of a generic manifest associated with a publisher of the generic manifest responsive to a trigger event (e.g., a rendition segment playback error, insufficient router connection, a manifest content retrieval error, a generic manifest storage error, generic manifest distribution error, etc.). The computer system can then query the manifest profile based on a set of characteristics (e.g., a publisher type, an error time, an error date, an error type, etc.) to trace the trigger event to an event source (e.g., a data storage bucket, an encoding error, a server, a router connection issue, etc.). For example, the computer system can: receive a request for investigation of the manifest profile associated with a publisher; query the manifest profile based on a set of characteristics descriptive of a trigger event; classify an event source associated with the trigger event; generate a notification indicating the event source; and transmit the notification to the device. Therefore, the computer system can facilitate profile sessionization and prompt investigation of errors in order to identify sources of errors.

Additionally, or alternatively, the computer system can prompt investigation of the manifest profile corresponding to the generic manifest based on a publisher request. In this example, the publisher of the generic manifest can request investigation of a particular content request from a particular device. More specifically, the computer system can: receive a request for investigation of a manifest profile from a device associated with a publisher of the generic manifest; query the manifest profile to identify a set of content requests associated with a session identifier; and return the set of content requests and a set of metadata associated with the content requests to the device associated with the publisher. Therefore, the computer system can enable a publisher of a generic manifest to review content requests for manifest content and fulfillment of content requests characterized by the manifest profile to investigate individual playback sessions.

17. Experiment and Feature Participation

In one implementation, in response to receiving the manifest request, the computer system can facilitate participation of the user into an experiment (e.g., software development experiment) or subscription to a feature. More specifically, the computer system can assign the experiment or the feature to the device based on characteristics of the user associated with the device (e.g., an individual user, a corporate customer, etc.). In one variation, the computer system can trigger participation of the device based on a type of encoding selection. In another variation, the computer system can enable a set of geo-restrictions for the device to permit playback of manifest content within a geographic area. For example, the computer system can: in response to receiving a first manifest request, for a first digital video, from a first device, induce participation of the first device in an experiment; and, in response to receiving a second manifest request, for a second digital video, from a second device, subscribe the second device to application of a feature. Therefore, the computer system can investigate feature integration across a set of devices.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprises:
during an initial time period:
in response to receiving a manifest request, for a digital video, from a first device associated with a first device address:
accessing a historical viewership rate of the digital video;
calculating a target length for a first session identifier, the target length proportional to the historical viewership rate; and
generating the first session identifier associated with the first device address, the first session identifier comprising a pseudorandom value characterized by the target length;
retrieving a generic manifest defining a set of rendition segment addresses of a set of rendition segments, within a set of renditions, available at the initial time period for the digital video;
generating a first manifest defining the set of rendition segment addresses annotated with the first session identifier; and
serving the first manifest to the first device;
during a first time period:
receiving a first content request for a first rendition segment, in the set of rendition segments, in a first rendition, in the set of renditions;
detecting the first device address in the first content request;
detecting the first session identifier in the first content request;
based on association between the first device address and the first session identifier:
extracting a first rendition segment address, for the first rendition segment, from the first content request;
retrieving the first rendition segment at the first rendition segment address; and
serving the first rendition segment to the first device address for playback; and
during a second time period:
receiving a second content request for a second rendition segment in the first rendition;
detecting a second device address in the second content request;
detecting the first session identifier in the second content request; and
based on disassociation of the second device address and the first session identifier, withholding delivery of the second rendition segment to a second device at the second device address.

2. The method of claim 1:
wherein retrieving the generic manifest comprises retrieving the generic manifest defining:
a first subset of rendition segment addresses in the set of rendition segment addresses, each rendition segment address in the first subset of rendition segment addresses comprising a first resource locator defining a location of a single rendition segment, in the set of rendition segments, in the first rendition of the digital video, the first rendition corresponding to a first bitrate and a first resolution; and
a second subset of rendition segment addresses in the set of rendition segment addresses, each rendition segment address in the second subset of rendition segment addresses comprising a resource locator defining a location of a single rendition segment, in the set of rendition segments, in a second rendition of the digital video, the first rendition corresponding to a second bitrate and a second resolution; and
wherein generating the first manifest comprises:
initializing the first manifest associated with the first device address; and for each rendition segment address, in the set of rendition segment addresses:
    storing the rendition segment address, appended with the first session identifier, in the first manifest;
wherein extracting the first rendition segment address from the first content request comprises:
    removing the first session identifier from the first content request to isolate a first resource locator defining a first location of the first rendition segment; and
wherein retrieving the first rendition segment comprises retrieving the first rendition segment at the first resource locator.

3. The method of claim 1:
wherein retrieving the generic manifest comprises retrieving the generic manifest defining:
    a first subset of rendition segment addresses in the set of rendition segment addresses, each rendition segment address in the first subset of rendition segment addresses comprising a resource locator defining a location of a single rendition segment, in the set of rendition segments, in the first rendition of the digital video, the first rendition corresponding to a first bitrate and a first resolution; and
    a second subset of rendition segment addresses in the set of rendition segment addresses, each rendition segment address in the second subset of rendition segment addresses comprising a resource locator defining a location of a single rendition segment, in the set of rendition segments, in a second rendition of the digital video, the first rendition corresponding to a second bitrate and a second resolution;
wherein generating the first manifest comprises:
    initializing the first manifest associated with the first device address; and
    for each rendition segment address, in the set of rendition segment addresses:
        encoding the first session identifier into the rendition segment address based on a key associated with the first session identifier; and
wherein extracting the first rendition segment address from the first content request comprises:
    retrieving the key associated with the first session identifier assigned to the first device address; and
    based on the key, retrieving the first rendition segment address by decoding the first content request isolate a first resource locator defining a first location of the first rendition segment.

4. The method of claim 1, further comprising:
at a first content delivery network:
    during the first time period:
        in response to receiving a second manifest request, for the digital video, from a third device associated with a third device address:
            generating a second session identifier associated with the third device address;
            storing the second session identifier and the third device address as a first identifier-address pair in a list of identifier-address pairs;
            transmitting the first identifier-address pair to a second content delivery network; and
            receiving a second identifier-address pair from the second content delivery network, the second identifier-address pair comprising a third session identifier associated with a fourth device address;
        storing the second identifier-address pair in the list of identifier-address pairs; and
    during the second time period:
        receiving a third content request for the first rendition segment, in the set of rendition segments, in the first rendition, in the set of renditions;
        detecting the fourth device address in the first content request;
        detecting the third session identifier in the first content request; and
        in response to identifying the third session identifier associated with the fourth device address stored as the second identifier-address pair in the list of identifier-address pairs:
            extracting the first rendition segment address, for the first rendition segment, from the third content request;
            retrieving the first rendition segment at the first rendition segment address; and
            serving the first rendition segment to the fourth device address for playback.

5. The method of claim 1:
wherein generating the first session identifier associated with the first device address comprises:
    generating the first session identifier associated with a first internet protocol address;
wherein detecting the first device address in the first content request comprises:
    detecting the first internet protocol address in the first content request;
wherein serving the first rendition segment to the first device address for playback comprises:
    serving the first rendition segment to the first internet protocol address for playback;
wherein detecting the second device address in the second content request comprises:
    detecting a second internet protocol address in the second content request; and
wherein withholding delivery of the second rendition segment to the second device at the second device address comprises:
    withholding delivery of the second rendition segment to the second device at the second internet protocol address.

6. The method of claim 1, further comprising:
during the second time period:
    based on disassociation of the second device address and the first session identifier:
        generating a notification indicating a content request by an unauthorized device; and
        serving the notification to a publisher of the digital video.

7. A method includes:
during an initial time period:
    in response to receiving a manifest request, for a digital video, from a first device associated with a first device address:
        generating a first session identifier associated with the first device address;
        retrieving a generic manifest defining a set of rendition segment addresses of a set of rendition segments, in a first rendition, of the digital video;
        generating a first manifest defining the set of rendition segment addresses annotated with the first session identifier; and
        serving the first manifest to the first device;
during a first time period:

receiving a first content request for a first rendition segment in the set of rendition segments of the first rendition;

detecting the first device address in the first content request;

detecting the first session identifier in the first content request;

extracting a first rendition segment address, for the first rendition segment, from the first content request;

retrieving the first rendition segment at the first rendition segment address; and serving the first rendition segment to the first device address for playback;

during a second time period:

receiving a second content request for a second rendition segment in the first rendition;

detecting a second device address in the second content request;

detecting the first session identifier in the second content request;

extracting a second rendition segment address, for the second rendition segment, from the second content request;

retrieving the second rendition segment at the second rendition segment address; and serving the second rendition segment to the second device address for playback; and associating the first content request and the second content request with a first playback of the digital video based on detection of the first session identifier in the first content request and the second content request.

8. The method of claim 7, further comprising:

accessing a video duration of the digital video;

deriving a playback duration of the first playback of the digital video based on the first content request and the second content request; and based on the video duration and the playback duration, deriving a watch percentage of the digital video at the first device address and the second device address.

9. The method of claim 7, further comprising:

during a third time period:

receiving a third content request for a third rendition segment in the first rendition;

detecting the second device address in the third content request;

detecting the first session identifier in the third content request; and in response to a time duration between the third time period and the second time period exceeding a threshold duration:

generating a second session identifier;

retrieving the generic manifest;

generating a second manifest defining the set of rendition segment addresses annotated with the second session identifier; and serving the second manifest to the first device;

receiving a fourth content request for the third rendition segment in the set of rendition segments in the first rendition; and associating the fourth content request with a second playback of the digital video based on detection of the second session identifier in the fourth content request.

10. The method of claim 9, further comprising:

during the third time period:

in response to the time duration between the third time period and the second time period exceeding the threshold duration:

calculating a session duration of a viewing session of the first device, the viewing session associated with the first session identifier.

11. The method of claim 7, further comprising:

during a third time period:

in response to receiving a second manifest request, for a second digital video, from the first device associated with the first device address:

retrieving a second generic manifest defining a second set of rendition segment addresses of a second set of rendition segments, within the first rendition, of the second digital video;

generating a second manifest defining the second set of rendition segment addresses annotated with the first session identifier; and serving the second manifest to the first device;

during a fourth time period:

receiving a third content request for a third rendition segment in the second set of rendition segments of the first rendition;

detecting the first device address in the first content request;

detecting the first session identifier in the first content request;

extracting the second rendition segment address, for the third rendition segment, from the third content request;

retrieving the third rendition segment at the second rendition segment address; and serving the third rendition segment to the first device address for playback;

associating the first content request, the second content request, and the third content request with the first playback of the digital video based on detection of the first session identifier in the first content request, the second content request, and the third content request; and deriving a content-switching rate based on the first content request, the second content request, and the third content request.

12. A method comprising:

during an initial time period:

in response to receiving a manifest request, for a digital video, from a first device associated with a first device address:

generating a first session identifier associated with the first device address;

retrieving a generic manifest defining a set of rendition segment addresses of a set of rendition segments, within a set of renditions, available at the initial time period for the digital video;

generating a first manifest defining the set of rendition segment addresses annotated with the first session identifier; and serving the first manifest to the first device; and in response to receiving a second manifest request, for the digital video, from a second device associated with a second device address:

generating a second session identifier associated with the second device address;

storing the second session identifier and the second device address as a first identifier-address pair in a list of identifier-address pairs;

retrieving the generic manifest;

generating a second manifest defining the set of rendition segment addresses annotated with the second session identifier; and serving the second manifest to the second device;
during a first time period:
  receiving a first content request for a first rendition segment, in the set of rendition segments, in a first rendition, in the set of renditions;
  detecting the first device address in the first content request;
  detecting the first session identifier in the first content request;
  based on association between the first device address and the first session identifier:
    extracting a first rendition segment address, for the first rendition segment, from the first content request;
    retrieving the first rendition segment at the first rendition segment address; and
    serving the first rendition segment to the first device address for playback;
  receiving a second content request for the first rendition segment;
  detecting the second device address in the second content request;
  detecting the second session identifier in the second content request; and
  in response to identifying the second device address and the second session identifier stored as the first identifier-address pair in the list of identifier-address pairs:
    extracting the first rendition segment address, for the first rendition segment, from the second content request;
    retrieving the first rendition segment at the first rendition segment address; and
    serving the first rendition segment to the second device address for playback; and
during a second time period:
  receiving a third content request for a second rendition segment in the first rendition;
  detecting a third device address in the third content request;
  detecting the first session identifier in the third content request; and
  based on disassociation of the second device address and the first session identifier, withholding delivery of the second rendition segment to the third device address.

13. The method of claim 12, further comprising:
in response to a time duration between the initial time period and the second time period exceeding a threshold time duration, removing the first identifier-address pair from the list of identifier-address pairs; and
during the second time period:
  receiving a fourth content request for the second rendition segment in the first rendition;
  detecting the third device address in the fourth content request;
  detecting the second session identifier in the fourth content request; and
  in response to failing to identify the third device address and the third device address stored as the first identifier-address pair in the list of identifier-address pairs:
    withholding delivery of the second rendition segment to a third device at the third device address.

14. A method comprising:
during an initial time period:
  in response to receiving a manifest request, for a digital video, from a first device associated with a first device address:
    generating a first session identifier associated with the first device address;
    retrieving a generic manifest defining a set of rendition segment addresses of a set of rendition segments, within a set of renditions, available at the initial time period for the digital video;
    generating a first manifest defining the set of rendition segment addresses annotated with the first session identifier; and
    serving the first manifest to the first device;
during a first time period:
  receiving a first content request for a first rendition segment, in the set of rendition segments, in a first rendition, in the set of renditions;
  detecting the first device address in the first content request;
  detecting the first session identifier in the first content request;
  based on association between the first device address and the first session identifier:
    extracting a first rendition segment address, for the first rendition segment, from the first content request;
    retrieving the first rendition segment at the first rendition segment address; and
    serving the first rendition segment to the first device address for playback;
  receiving a set of content requests for a subset of rendition segments from a second device associated with a third session identifier at a request frequency; and
  in response to the request frequency exceeding a request frequency threshold:
    flagging the second device as a spamming device;
    withhold distribution of the subset of rendition segments to the second device; and
    associating the third session identifier with the spamming device; and
during a second time period:
  receiving a second content request for a second rendition segment in the first rendition;
  detecting a second device address in the second content request;
  detecting the first session identifier in the second content request; and
  based on disassociation of the second device address and the first session identifier, withholding delivery of the second rendition segment to the second device address;
  receiving a third content request from the second device associated with the third session identifier; and
  in response to association of the third session identifier with the spamming device, withholding distribution of manifest content to the second device.

15. A method comprises:
during an initial time period:
  in response to receiving a manifest request, for a digital video, from a first device associated with a first device address:
    generating a first session identifier associated with the first device address;
    retrieving a generic manifest defining a set of rendition segment addresses of a set of rendition segments, within a set of renditions, available at the initial time period for the digital video;
generating a first manifest defining the set of rendition segment addresses annotated with the first session identifier; and
serving the first manifest to the first device;
during a first time period:
receiving a first content request for a first rendition segment, in the set of rendition segments, in a first rendition, in the set of renditions;
detecting the first device address in the first content request;
detecting the first session identifier in the first content request;
based on association between the first device address and the first session identifier:
extracting a first rendition segment address, for the first rendition segment, from the first content request;
retrieving the first rendition segment at the first rendition segment address; and
serving the first rendition segment to the first device address for playback;
during a second time period:
receiving a second content request for a second rendition segment in the first rendition;
detecting a second device address in the second content request;
detecting the first session identifier in the second content request; and
based on disassociation of the second device address and the first session identifier and in response to the second device address differing from the first device address, withholding delivery of the second rendition segment to a second device at the second device address; and
during a third time period between the first time period and the second time period:
receiving a third content request for a third rendition segment in the first rendition;
detecting the first device address in the third content request;
receiving a fourth content request for the third rendition segment in the first rendition;
detecting a third device address in the fourth content request;
detecting the first session identifier in the third content request and the fourth content request; and
based on receiving the third content request with the first session identifier and the fourth content request with the first session identifier within a threshold time duration, withholding delivery of the third rendition segment to the first device address and the third device address.

16. A method comprises:
during an initial time period:
in response to receiving a manifest request, for a digital video, from a first device associated with a first device address:
generating a first session identifier associated with the first device address;
retrieving a generic manifest defining a set of rendition segment addresses of a set of rendition segments, within a set of renditions, available at the initial time period for the digital video;
generating a first manifest defining the set of rendition segment addresses annotated with the first session identifier; and
serving the first manifest to the first device;
during a first time period:
receiving a first content request for a first rendition segment, in the set of rendition segments, of a first rendition, in the set of renditions;
detecting the first device address in the first content request;
detecting the first session identifier in the first content request;
based on association between the first device address and the first session identifier:
extracting a first rendition segment address, for the first rendition segment, from the first content request;
retrieving the first rendition segment at the first rendition segment address; and
serving the first rendition segment to the first device address for playback; and
during a second time period:
receiving a second content request for a second rendition segment in the first rendition;
detecting a second device address in the second content request;
detecting the first session identifier in the second content request; and
based on disassociation of the second device address and the first session identifier, withholding delivery of the second rendition segment to a device at the second device address;
during a third time period between the first time period and the second time period:
receiving a third content request for a third rendition segment in the first rendition;
detecting a third device address in the third content request;
detecting the first session identifier in the third content request;
serving the third rendition segment to the third device address for playback by a third device at the third device address; and
associating the third device address with the first session identifier;
associating the first content request and the third content request with a singular playback of the digital video based on presence of the first session identifier in the first content request and the third content request.

17. The method of claim 16, further comprising:
during the first time period:
accessing a first set of rendition segment addresses of the set of rendition segments, within the set of renditions, available at the first time period for the digital video;
generating a first manifest update defining the first set of rendition segment addresses annotated with the first session identifier; and
serving the first manifest update to the first device address; and
during the third time period:
accessing a second set of rendition segment addresses of the set of rendition segments, within the set of renditions, available at the third time period for the digital video;

generating a second manifest update defining the second set of rendition segment addresses annotated with the first session identifier; and serving the first manifest update to the third device address.

* * * * *